W. H. TROUT.
SAWMILL SET WORKS.
APPLICATION FILED NOV. 20, 1903.
995,205.
Patented June 13, 1911.
5 SHEETS—SHEET 3.
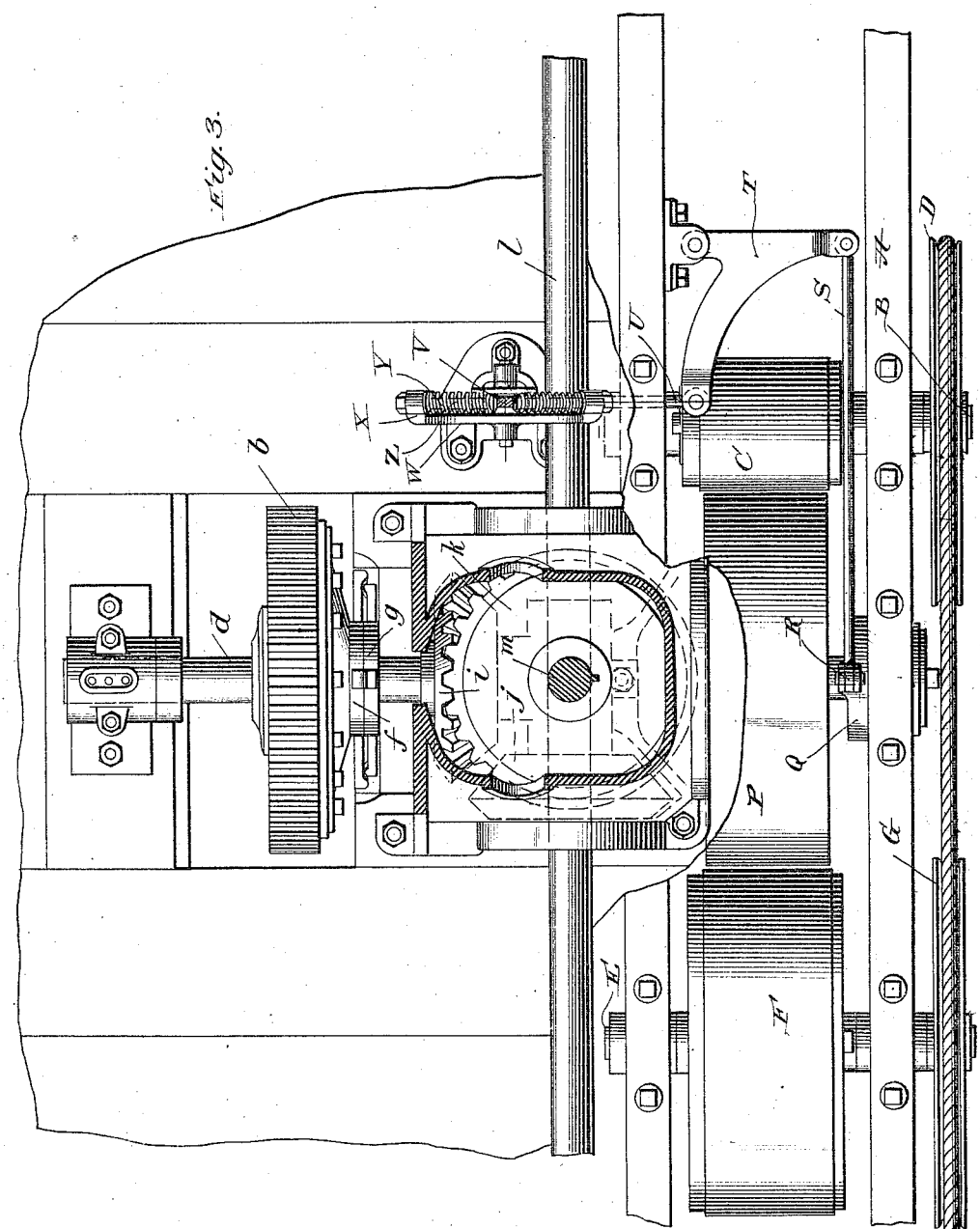

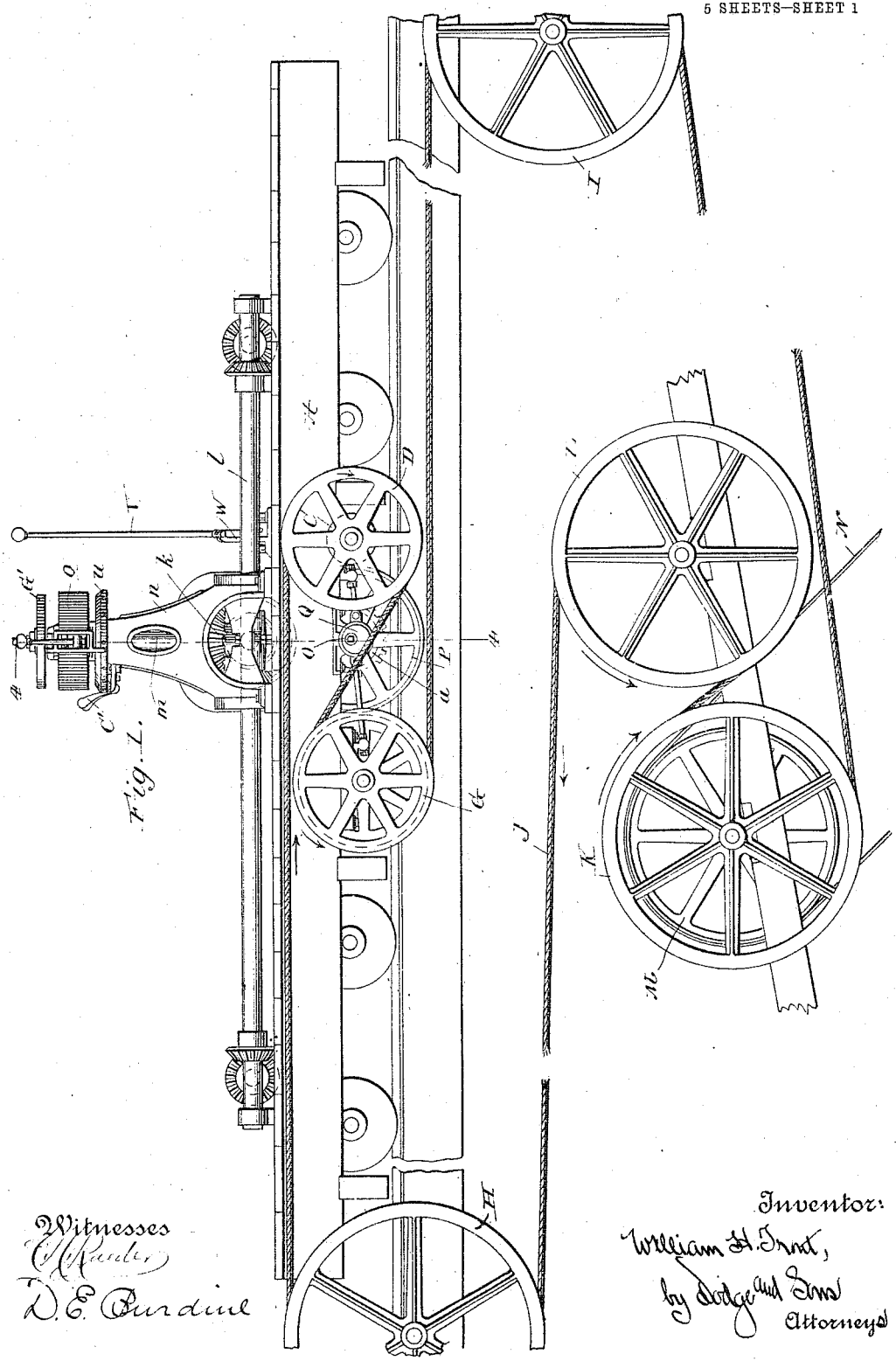

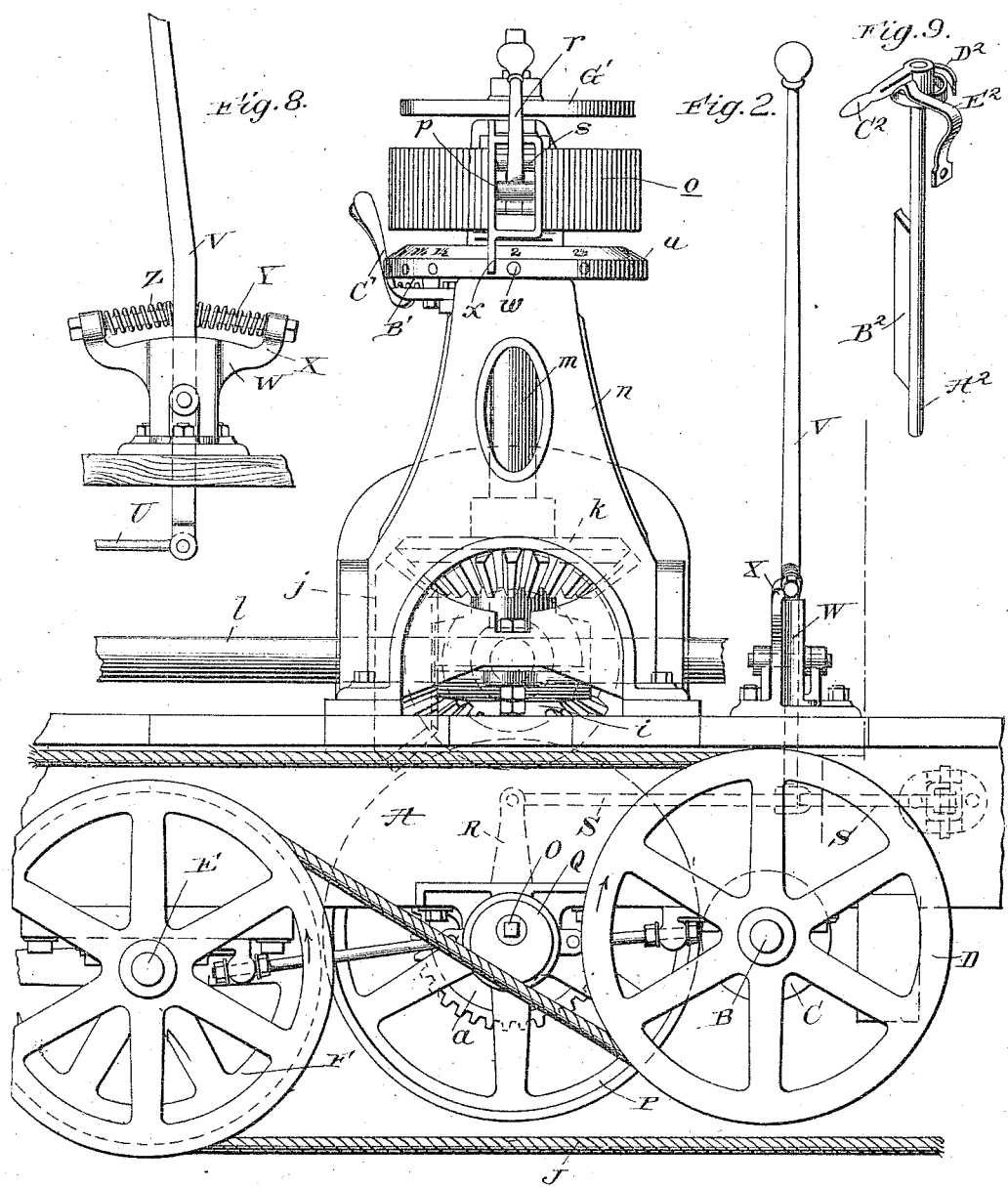

W. H. TROUT.
SAWMILL SET WORKS.
APPLICATION FILED NOV. 20, 1903.
995,205.
Patented June 13, 1911.
5 SHEETS—SHEET 4.
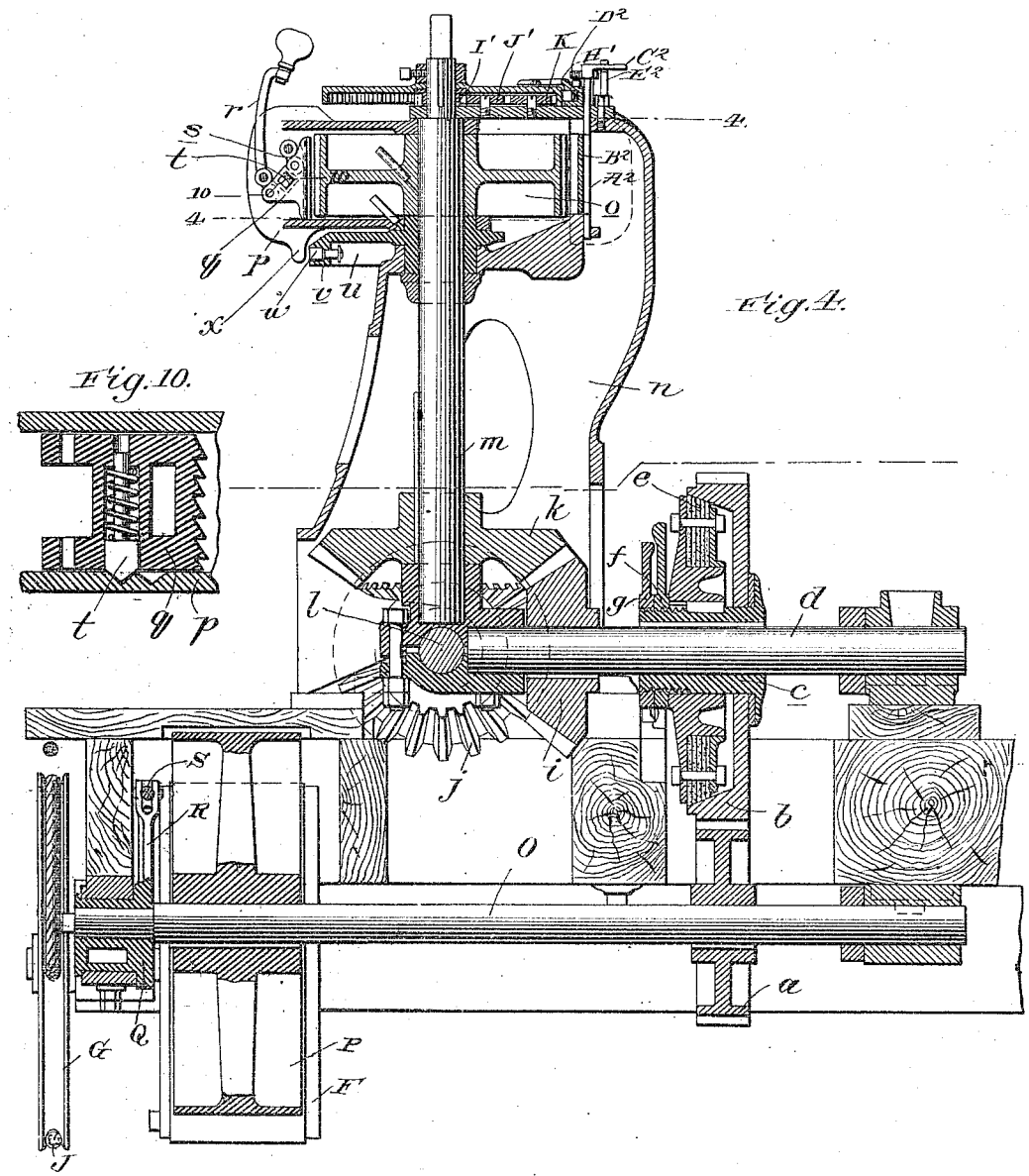
Witnesses
Inventor:
William H. Trout W. H. TROUT.
SAWMILL SET WORKS.
APPLICATION FILED NOV. 20, 1903.
995,205.
Patented June 13, 1911.
5 SHEETS—SHEET 5.
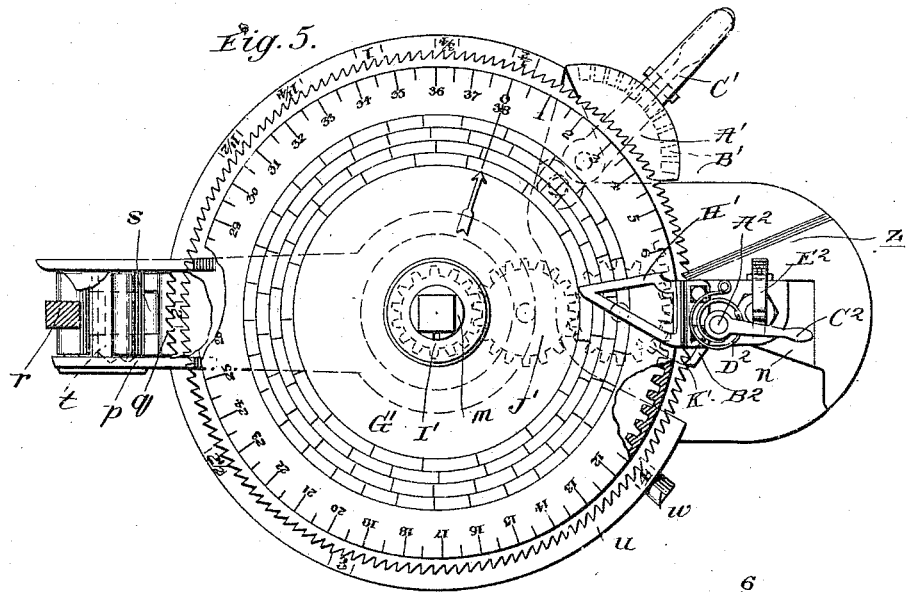
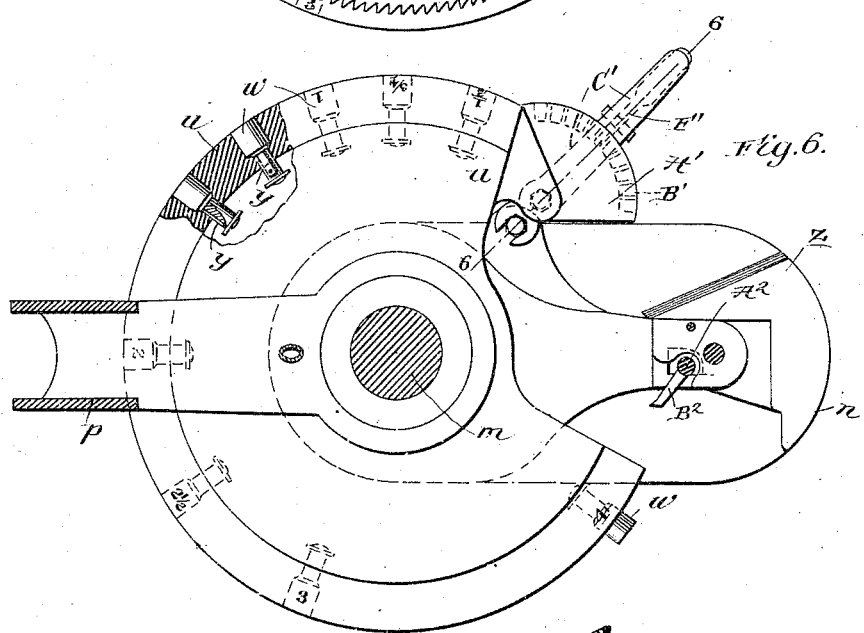
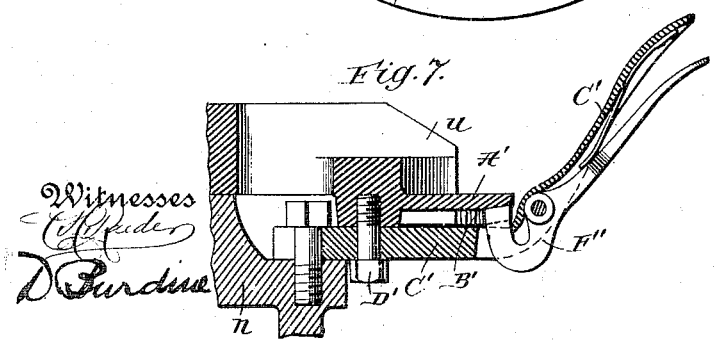
Witnesses
Inventor:
William H. Trout,
by Dodge and Sons
Attorneys.

UNITED STATES PATENT OFFICE.

WILLIAM H. TROUT, OF MILWAUKEE, WISCONSIN, ASSIGNOR TO ALLIS-CHALMERS COMPANY, OF MILWAUKEE, WISCONSIN, A CORPORATION OF NEW JERSEY.

SAWMILL SET-WORKS.

995,205.      Specification of Letters Patent.      Patented June 13, 1911.

Application filed November 20, 1903. Serial No. 182,000.

*To all whom it may concern:*

Be it known that I, WILLIAM H. TROUT, a citizen of the United States, residing at Milwaukee, in the county of Milwaukee and State of Wisconsin, have invented certain new and useful Improvements in Sawmill Set-Works, of which the following is a specification.

My present invention relates to improvements in saw-mill carriages, the construction and advantages of which will be hereinafter set forth, reference being had to the annexed drawings, wherein:

Figure 1 is a side elevation of a saw-mill carriage, showing my improved set-works and the means employed for imparting motion to the setting and receding drums; Fig. 2 a similar view on an enlarged scale; Fig. 3 a top plan view of the operating portions of the set-works, the stand or column being broken away to more clearly show the parts beneath; Fig. 4 a transverse vertical sectional view taken on the line 4—4 of Fig. 1; Fig. 5 a top plan view of the upper portion of the stand or column, showing the scales and the setting lever; Fig. 6 a horizontal sectional view, taken on the line 4—4 of Fig. 4; Fig. 7, a vertical sectional view taken on the line 6—6 of Fig. 6; Fig. 8 a detail view showing the lever employed for shifting the friction driving drum or pulley; and Fig. 9 a detail perspective view, showing the means employed for locking the setting lever against rebounding action. Fig. 10 is a sectional view taken on line 10, 10, Fig. 4.

The principal object of my invention is to provide a simple and efficient set-works in which the degree of movement to be imparted to the knees can be readily determined and effected without overthrowing, breaking, or damaging the mechanism, even though the operator fail to disengage the parts from the constantly rotating friction drum or pulley.

A further object of the invention is to construct the mechanism so that the set-shaft and knees may be worked by hand, should the power which drives the operating drum fail.

The invention will be best understood upon reference to the annexed drawings, wherein—

A denotes the saw-mill carriage, which may be propelled in any suitable manner.

Mounted upon carriage A is a shaft B, said shaft carrying a friction driving drum or pulley C, preferably formed of paper. Upon the outer end of shaft B is mounted a sheave-wheel D. A second shaft E is likewise mounted upon the carriage, said shaft being parallel with shaft B, and carrying a larger drum or pulley F. A sheave-wheel G is carried at the outer end of shaft E, the sheaves D and G being in line with each other and in the same vertical plane with larger sheave-wheels H and I adjustably secured to the frame-work of the mill. An endless rope or band J passes about the sheaves G, D, H and I, and about similar sheaves K and L, which, as shown in Fig. 1, are likewise secured to the frame-work of the mill. The shaft upon which sheave-wheel K is secured also carries a pulley M, about which passes a belt N, said belt serving to impart motion to pulley M and to sheave K. By this construction motion will be imparted to rope J, to the sheaves G and D, and consequently to the paper friction drums C and F, said drums rotating in the directions indicated by the arrows in Figs. 2 and 3.

A shaft O, carrying a friction drum P, preferably of iron, is mounted intermediate the shafts B and E, the outer end of shaft O being supported in an eccentric or sliding box or bearing Q, so that drum P may be thrown into contact with either drum C or F. Box Q is provided with an upwardly-extending arm R, to the end of which is attached a rod S, the opposite end of said rod being fastened to a bell-crank lever T, which has its opposite end secured to a second rod U, which in turn is connected to the lower end of an operating lever V,—see Figs. 3 and 8. As will be seen more particularly upon reference to Figs. 2, 3 and 8 of the drawings, lever V is fulcrumed or pivoted in a stand W, which is provided with oppositely-extending arms X. Mounted in the ends of said arms, and free to move therethrough, are rods or bolts Y, the inner rounded ends of which bear against the opposite sides of lever V. Bolts Y are held inwardly by coiled springs Z, one of which is placed around each bolt. The normal position of lever V is that shown in Fig. 8, in which position friction drum P will be held out of contact with either the setting drum C or the receding drum F. Springs Z will always tend to bring lever V back to its medial position, and as a consequence will withdraw the intermediate drum P from contact with either the setting or the receding drum, as the case may be.

In order to reduce to a minimum the amount of transmission means which it is necessary to have stopped at the time of setting, and also to provide an easily accessible means for localizing wear of friction transmission and make same adjustable, a second friction device is used located between the point of application of the actuating friction means and the set shaft and so located as to be freely accessible and readily renewable.

Keyed to shaft O, near its inner end, is a pinion $a$, which in turn meshes with a spur gear or pinion $b$ loosely mounted upon a hub $c$, which in turn is keyed fast to a shaft $d$, said shaft by preference being placed above and in line with shaft O. Pinion $b$ is provided with a beveled face against which works a paper or similar friction member $e$. Said friction member may be forced inwardly by manipulation of the nuts $f$ and $g$, which as best shown in Figs. 3 and 4 are provided with extended arms for the purpose of permitting the operator to adjust them with his foot. Shaft $d$ has keyed to it a bevel pinion $i$, which meshes with a bevel wheel $k$, which meshes with a pinion $j$ secured upon the set-shaft proper. The bevel wheel $k$ is mounted upon a shaft $m$, mounted to rotate within a column or stand $n$. The set-shaft, as will be readily understood by those skilled in the art, may be connected up in any approved manner to impart the requisite motion to set and recede the knees. Shaft $m$ has secured to it a toothed wheel $o$, said wheel rotating with the shaft at all times. An arm or bracket $p$ is pivotally mounted upon shaft $m$, the members thereof passing to the upper and lower sides of wheel $o$, as best shown in Fig. 4. A block $q$, provided with teeth which correspond to the teeth formed in the vertical or outer face of wheel $o$, is carried by arm or bracket $p$, said block being designed to be moved inwardly to permit its teeth and the teeth of wheel $o$ to lock together when desired. Block $q$ is moved inwardly or outwardly by means of a lever $r$ fulcrumed in arm or bracket $p$ and pivotally connected to said block near its lower end.

A link $s$ forms the support for the upper end of the block, and insures a parallel movement of the face of the block with the teeth formed upon wheel $o$.

A spring-actuated locking pin $t$ Fig. 10 is carried by block $q$, the beveled nose of said pin entering recesses or depressions formed in the inner face of the arm or bracket $p$, and thus serving to hold the block in one or the other of its positions.

A plate or disk $u$, Fig. 4 provided with a downwardly depending rim or skirt $v$, is journaled upon the shaft $m$ below wheel $o$ and arm or bracket $p$. In the rim of said disk is mounted a series of pins $w$, the outer ends of which normally stand flush with the outer face of the rim or skirt $v$. The construction of the pins is such that any one of them may be protruded beyond the periphery of the skirt, as shown in Fig. 6, to form a stop or abutment for the downwardly-projecting finger or member $x$ Fig. 4 formed upon arm or bracket $p$, said pins being held in their adjusted positions by means of springs $y$, see Fig. 6. The location of the pins around the periphery of disk $u$, with relation to the fixed stop or abutment $z$ formed upon column $n$, will be such as to represent the standard thicknesses of lumber; as, for instance, the first pin will indicate a distance of one-half of an inch from the saw, the next three-fourths of an inch, and so on around the disk to a distance of, say, four inches or that indicated by the pin shown protruded in Fig. 6.

Plate or disk $u$ is formed at one side with a segmental member A′, Fig. 7 the under face of which is provided with a series of teeth B′. A lever C′ is pivotally connected to disk $u$ by a bolt D′, the inner end of said lever being fulcrumed upon a fixed stud secured to the stand $n$. A locking dog or detent F′ is pivoted to lever C′, the nose thereof operating with teeth B′ to lock disk $u$ against movement about the shaft $m$.

If it be desired to shift disk or plate $u$, in order to increase the distance between the fixed abutment $z$ and any of the pins $w$, such adjustment can be readily effected by withdrawing the locking detent F′ and moving the lever C′ in one or the other direction, which movement will effect a relative movement of plate or disk $u$ with reference to the fixed abutment $z$.

Rotatably mounted upon the upper end of the shaft $m$ is an index plate or dial G′, provided with a scale to indicate the distance of the knees from the saw, and also with the usual lumber scales. This index plate or dial works past a fixed pointer H′ secured to the stand $n$. Rotary motion is imparted to said index plate or dial through pinion I′, keyed to the shaft $m$, and intermediate idler gears J′, K′, the latter in turn meshing with the teeth formed upon the inner face of the depending skirt or rim of said dial.

As will be seen upon reference to Figs. 2, 3 and 4, the upper end of shaft $m$ is squared, as is also the outer end of shaft O. This is done to permit a crank or lever to be applied to said shafts to impart motion thereto, in order to effect the setting or receding of the knees in case the power mechanism should become disabled.

The relative size of the transmitting pinions, as for example, the size of the pinions $a$ and $b$, may be varied according to the character of the work.

In order to prevent any rebound of the parts when operating upon heavy lumber, or with a large carriage, I employ a locking-pawl for the toothed wheel $o$, best shown in Figs. 4, 5 and 9. Mounted in the stand $n$, adjacent to the toothed wheel $o$ and parallel with the outer face thereof, is a shaft $A^2$, carrying a pawl $B^2$. A handle or lever $C^2$ is secured to the upper end of the shaft, while a coiled or volute spring $D^2$ is attached at one end to the frame and at the opposite end to the shaft $A^2$, said spring serving to hold the pawl in contact with the teeth of the wheel $o$, and to prevent retrograde movement thereof. When it is desired to use the setting mechanism without employing the pawl, the handle or lever $C^2$ may be drawn around over the free end of a spring $E^2$, which is secured to the column $n$ and stands in line with the under face of the handle, as is best illustrated in Figs. 5 and 9.

The operation of the apparatus is as follows: Assuming that it be desired to cut a 4-inch plank or slab, the pin $w$ located at the indication "4" (Figs. 5 and 6) is protruded outwardly, and the setting arm or bracket $p$ is brought around until the projection $x$ thereon comes into contact with pin $w$. The handle of lever $r$ is then drawn outwardly to force the teeth of block $q$ into engagement with the teeth upon the wheel or disk $o$. The operator will then manipulate handle V, by which friction drum P will be shifted into contact with the setting drum C, and as a consequence motion will be imparted to said friction drum, which in turn will impart it to the set-shaft through shaft O, pinion $a$, spur gear $b$, friction member $e$, shaft $d$, bevel pinion $i$, bevel wheel $k$ and bevel pinion $j$. At the same time motion will be imparted to shaft $m$ through gear $h$, wheel $o$ being rotated and carrying with it the setting arm or bracket $p$. This motion continues until said arm comes into contact with the fixed abutment $z$, which by preference will be provided with a rubber face or cushion. Contact of the setting arm or bracket with said fixed abutment will prevent further rotation of shaft $m$, and owing to the direct connection of said shaft with the set-shaft $l$ through the gears $j$ and $k$, rotation of shaft $l$ will cease and the knees will be brought to rest when the log has been advanced four inches. Should the operator fail to release lever V, and permit springs Y to act and thus to throw friction drum P to its normal position intermediate drums C and F, no damage will be done, since friction member $e$ will permit pinion $b$ to rotate independently of member $e$. As before noted, if it be desired to saw the lumber either slightly above or slightly below 4 inches, lever $C'$ will be manipulated to shift plate or disk $u$ with relation to the fixed abutment, either to increase or to diminish the distance, as desired. In this manner, it will be seen, the thickness of the lumber turned out may be varied at the will of the operator. When it is desired to recede the knees, it is simply necessary to shift lever V in such direction as to throw the intermediate friction drum P into contact with the relatively large receding drum F, the operator holding said lever until the knees have been fully receded, or receded the desired distance. At such times locking block $q$ will be thrown by the operator to such position that its teeth will be out of contact with the teeth of wheel $o$, permitting said wheel to rotate independently thereof.

As will be noted, the friction drums are all mounted upon the carriage, and motion is imparted to the setting and receding drums by a simple rope-drive.

Having thus described my invention, what I claim is:

1. A saw mill carriage, means carried by the carriage including a setting drum, a receding drum, a drum intermediate the setting and the receding drums, a shiftable support for the intermediate drum, means for shifting the support, a set-shaft and a power transmission means intermediate the set-shaft and the intermediate drum, including an adjustable friction connection.

2. The combination of a saw mill carriage, transmission means mounted on said carriage and including a set-shaft, means actuated by said set-shaft for setting a log on said carriage, a friction drive comprising pulleys in direct contact for applying power to said transmission means, means for manually controlling said friction drive to apply said power, and a freely accessible and readily renewable friction slip connection interposed in said transmission means between said friction drive and said set-shaft.

3. In a set-works, a frame, a setting arm pivoted on the frame, a disk on the frame, pins on the disk movable into the path of the setting arm, a lever fulcrumed on the frame and pivoted on the disk, and means for locking the lever to the disk in an adjusted position.

4. In a set works, the combination with a frame, of a set shaft, means for interchangeably turning said shaft for setting and receding operation of the set works, an arm pivoted about and engageable with the setting mechanism and operable to determine the required set, a plate pivoted coaxially with said arm and bearing an outlying-stop for the arm, a home-stop on the frame for the arm, a pin on the frame, a lever pivoted on the outlying-stop plate and engaging the pin, and means for locking the lever to the plate in an adjusted position.

5. In a set-works, a set-shaft, a toothed wheel rotatable therewith, a setting arm, means for positively locking the arm and wheel to each other against motion in either direction, a positive stop for the arm and wheel, and means for locking the wheel against recoil.

6. In a set-works, a set-shaft, a toothed wheel rotatable therewith, a setting arm, means for positively locking the arm and wheel to each other against motion in either direction, a positive stop for the arm and wheel, means for locking the wheel against recoil, and means for holding the locking means ineffective.

7. The combination of a saw mill carriage, a set-shaft thereon, power means for driving said set-shaft, a stop lever having teeth for locking, a rotating element forming a part of said power means having teeth engageable with the stop lever teeth, both sets of teeth being inclined for stopping of said set-shaft by said stop-lever, a positive stop against which said lever takes during said stopping, and a pawl engaging the back of the teeth of the rotating element for preventing recoil of the stopped set shaft.

In testimony whereof I have signed my name to this specification in the presence of two subscribing witnesses.

WILLIAM H. TROUT.

Witnesses:
CARL JUERGENS.
JOHN LUND.